May 15, 1951  E. GRETENER  2,553,249
TELEMETRIC TRANSMISSION OF ROTARY MOVEMENTS
BY ELECTROMECHANICAL MEANS
Filed Dec. 31, 1947  3 Sheets-Sheet 1

INVENTOR
EDGAR GRETENER
BY Moore & Hall
ATTORNEYS

INVENTOR
EDGAR GRETENER

Patented May 15, 1951

2,553,249

UNITED STATES PATENT OFFICE 2,553,249

TELEMETRIC TRANSMISSION OF ROTARY MOVEMENTS BY ELECTROMECHANICAL MEANS

Edgar Gretener, Zurich, Switzerland

Application December 31, 1947, Serial No. 795,155
In Switzerland March 25, 1946

13 Claims. (Cl. 318—26)

The present invention is concerned with the telemetric transmission of rotary movements.

It is an object of the invention to utilize a rotating field system in the telemetric transmission of rotary movements.

It is an object of the invention to introduce a simulated error with reversed sign into the telemetric drive system.

It is an object of the invention to minimize the error in the telemetric transmission of rotary movement by opposing the error vector by a vector of equal magnitude and opposite sign.

It is an object of the invention to use a three-phase current resistance transmitter having two mechanical inputs and a synchronous motor as a receiver whereby the drive movement that is to be transmitted acts on one mechanical input and an error simulating network reproducing the error acts on the other mechanical input.

It is an object of the invention to use a three-phase current resistance transmitter and a synchronous motor having an additional mechanical input whereby an error simulating network reproducing the transmission error acts on said additional mechanical input.

It is an object of the invention to utilize electromechanical means for the telemetric transmission of power employing a mechanical simulation of the system.

The telemetric transmission of rotary movements can be advantageously effected electromechanically with the aid of rotating field systems. A telemetric transmission system of this type may be shown, for example in Fig. 3a, comprise a resistance transmitter at the transmitting end arranged to convert mechanical movements continuously into their corresponding electric counterparts of the rotating field, and a synchronous motor at the receiving end arranged to reconvert the transmitted electrical movements of the rotating electrical field into their corresponding mechanical counterpart movements of the motor shaft. The polyphase current which carries the electrical movements is produced by a rotating resistance modulator at the transmitting end connected to a direct current source. Preferably three-phase current is produced. The resistance transmitter comprises a resistance winding 80 with two branches annularly mounted on a rotating coil member not shown in the drawing. A plurality of appropriately distributed tapping points are connected to the segments of commutator 51 also mounted on said coil member. The resistance is fed by D. C. via two brushes 55 and 56 and two slip rings 53 and 54. Three brushes 58 sliding on said commutator and disposed at angles of 120° produce a three phase current which excites inside the stator of the synchronous motor 81 at the receiving end a magnetic field vector corresponding in its direction to the position of the brushes 58 relative to the two feeding points of the resistance winding and rotating synchronously with the coil member of the transmitter. A permanent magnet 82 inside said stator is free to rotate around its axis and will assume a position where its magnetic axis N-S coincides with the vector of the magnetic field. Consequently the magnet will reproduce every angular displacement of the coil member of the transmitter. It is evident and well known in the art that the permanent magnet can be replaced by a wound armature fed with D. C.

Consideration of the underlying theory indicates that such a transmission system does not operate in flawless fashion because the torque of the receiving motor is represented merely by or is a function of the angle psi between the axis of the rotating field and the magnetic rotor axis. Thus when a synchronous motor is loaded the rotor shifts its phase backward relative to the instantaneous sense of rotation by an angle psi as the load is applied and the motor takes more power from the line because the current drawn by the armature or rotor is shifted backward, and more in phase with the line voltage thus the receiver produces an increased torque. The component of line voltage necessary to equalize the counter e. m. f. does not change in magnitude because the average speed of the motor is a constant but it also shifts backward by an angle beta so that the armature current leads the balancing voltage component by an angle equal to beta plus theta, where theta is the angle between the current and line voltage vectors. Beta is treated as zero at no load since the balancing voltage component and the line voltage are substantially the same both in magnitude and phase. The power drawn is the product of the balancing voltage component, the current and the cosine of the sum of the angles theta and beta. When the field of such a motor is increased the phase angle between current and the voltage component is increased. This effect is termed over excitation and is somewhat reduced by the resulting armature reaction. The reverse effect is obtained by decreasing the field strength. Accordingly, where the power delivered to the motor is maintained constant, the power factor of the motor is a function of the field current and may be obtained for any operating condition of a given synchronous motor by plotting a family of V curves showing the relation between field current and armature current for representative loadings.

The phase displacement due to the loading of a synchronous motor may be regarded as an angle of error in the telemetrics of rotary movements. It occurs at the receivng motor during the transmission of a given movement and may be represented by the relation between the rotational torque and the angle psi at any given instant. Within practical usable limits a linear relationship may be assumed to exist between these two magnitudes because psi is a small angle and well within the range in which the sign of an angle is substantially equal to the angle itself as measured in radians.

It is an object of the present invention to provide a system for transmitting rotary movements by electromechanical means in which separate means are provided for reproducing continuously and automatically the transmission errors of the system and adding continuously the reproduced transmission errors with reversed sign to the transmitted rotary movement at an appropriate point of the transmission, so that the phase displacement angle which for present purposes would introduce error is continuously and automatically compensated.

One of the principal difficulties in providing a solution for the above problem resides in correctly introducing the artificially simulated phase displacement error angle into the transmission system in such a manner that the production of disturbing reactive coupling or feed back effects is avoided.

Perhaps the most clean-cut solution is provided by using a rotary field transmission system employing a rotary field resistance transmitter and a synchronous motor as the receiver with the angle psi being negatively introduced into the control circuit at the transmitter or receiver by an artificial line or error simulating network free from feedback effects. This is achieved by using a transmitter having two mechanical inputs or a receiver bearing one electrical and one mechanical input.

Throughout the following discussion the angle alpha ($\alpha$) indicates the initial movement supplied to the transmitter. The angle psi ($\psi$) is actual error angle of the load. That is with an input signal $\alpha$ the load would move if uncorrected. The angle phi ($\phi$) is the error angle produced by the simulated or second system. Every attempt is made to have $\phi$ equal $\psi$, so that when combined in the principal system they will cancel each other so that the input angle $\alpha_1$ at the transmitter and $\alpha_2$ the angle of movement of the load are equal.

In the drawings.

In the drawing like numbers refer to like parts throughout.

Figure 1:
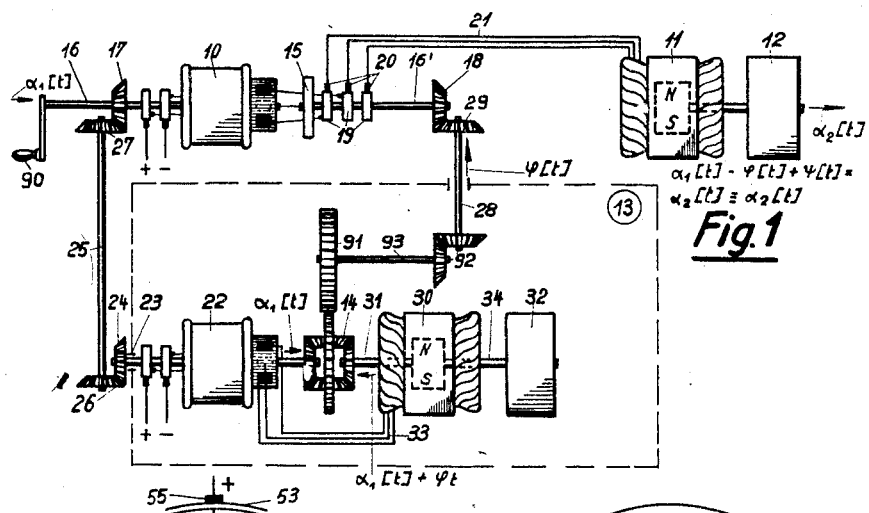
Figure 1 is a schematic diagram of one form of system.

The rotatory movement that is to be transmitted and that may be described by a function of the time $\alpha_1(t)$ is e. g. by a crank 90 applied to the rotary field transmitter 10 which supplies receiver 11 connected with a load 12. The resultant movement of receiver 11, where no other means is employed for correction, is equal to $\alpha_2'(t)$ which differs more or less from $\alpha_1(t)$. This difference represents the transmission error, which, as discussed above, may be expressed in terms of the rotational phase shift of the armature as it is placed under load and is obtained as $\alpha_1(t) - \alpha_2'(t) = \psi(t)$. When a sinusoidal movement $\alpha_1(t) = A_1 \sin(\omega t)$ is being transmitted, the function $\alpha_2'(t)$ has a definite amplitude ratio and phase shift in contrast to $\alpha_1(t)$ depending upon the frequency of said sinusoidal movement. This may be expressed by the following equations.

$$\alpha_2'(t) = A_2' \sin(\omega t + \varphi)$$
$$A_2'/A_1 = t(\omega) \text{ amplitude ratio}$$
$$\varphi = t(\omega) \text{ phase shift}$$

A network 13 may be arranged to yield a phase displacement error angle equal to the error angle $\psi$ of the basic system insofar as its amplitude ratio and phase shift in the frequency range under consideration coincide with the corresponding values of the transmitting system for any given movement $\alpha_1(t)$. The network 13 in this case may be regarded as an electromechanical equivalent of the actual transmission system. The phase displacement error $\psi$ angle produced by the network 13 is substantially obtained at the output gear of a differential gear, the two input shafts of which are coupled with the transmitter and the receiver of the network and is introduced into the basic system by proportionately rotating the brush assembly 15. Through this arrangement the transmission errors $\psi$ of the receiving system are balanced out so far as it is possible for the latter correctly to reproduce such transmission errors introduced into the transmission system to make $\phi$ equal $\psi$. For practical purposes this condition is fulfilled in the case of all movements that are to be transmitted and which are intended to be taken into consideration in connection with such telemetric controls. In order to insure positive operation of the telemetric control, it is, however, not possible to compensate the transmission error below a certain value determined by the residual minimum of operative play of the transmission system. Necessary machining tolerances impose certain limitations and the remaining transmission errors generally obtainable by such an error compensated transmission system are of the same order of magnitude as the residual errors remaining in the compensated system and which cannot be compensated.

Transmitter 10 is provided with an extended shaft 16 having bevel gears 17 and crank 90 mounted thereon. A shaft 16 carries brush assembly 15 and three phase slip ring assembly 19 with its brushes 20 connected to receiver 11 by three phase transmission line 21. Electrical equivalent error simulating network 13 has a transmitter 22 equivalent to transmitter 10 and a shaft 23 mounting a bevel gear 24 at one end and a bevel gear forming a part of differential gearing 14 at the other end. Connecting shaft 25 mounts bevel gear 26 at one end mating with bevel gear 24 and at the other end mounts bevel gear 27 mating with gear 17. Connecting shaft 28 is connected to differential 14 by gears 91 and 92 and shaft 93 and has a bevel gear 29 mating with gear 18 mounted on its other end. Receiver 30, the equivalent of receiver 11, has a shaft 31 having a bevel gear forming part of differential gearing 14 mounted on one end and is connected to load 32, corresponding to load 12, at its other end. Three phase line 33 connects transmitter 22 and receiver 30. Receiver 11 and load 12 are connected by a shaft 34.

If, when an equivalent error simulating network is used, the remaining error of the telemetric control system should still be substantially greater than the operative play, the error simulating network method can be applied to the entire telemetric control with the first error simulating network, and employed in the same manner as in the case of the basic system that is not equipped with an error simulating network. This arrangement provides a second error simulating network which simulates the entire system with the first error simulating network. Said second network produces at its output the value of approx. $\psi - \phi$, the output of the second network is connected in cascade with the output of the first error simulating network and results in a supplementary reduction of the transmission error as it introduces with inverse sign the value of $\psi - \phi$, which approximately corresponds to and compensates the error remaining after compensating the transmission system with the first network. The transmission errors can be made smaller than any assigned value by continuing this procedure.

Figure 2:
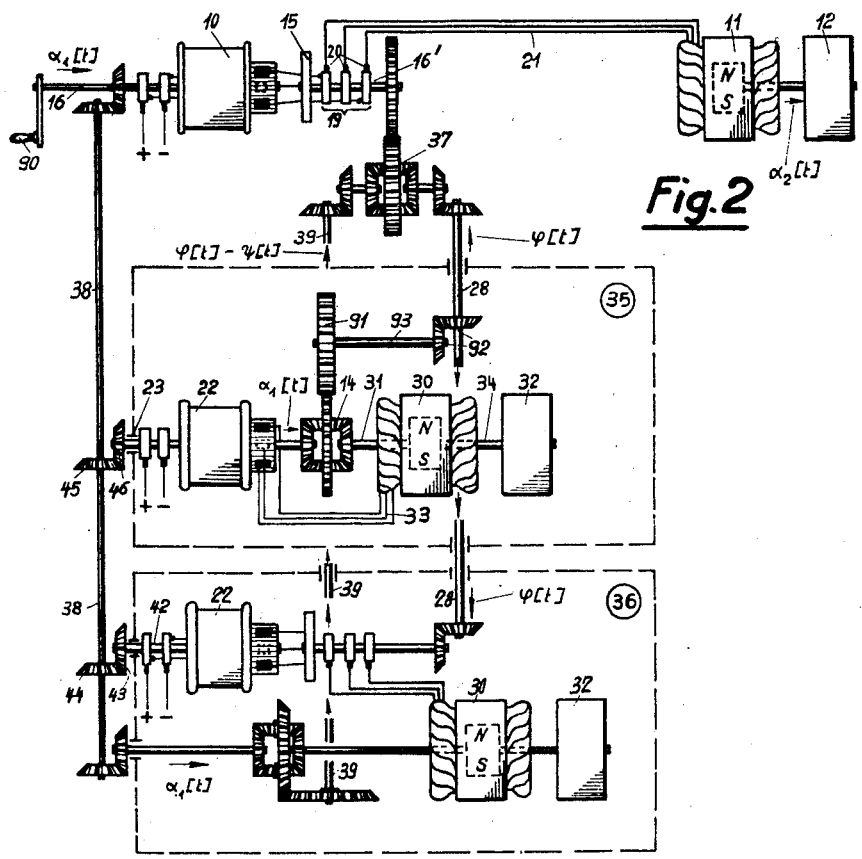
Figure 2 is a schematic diagram of another form of system with two error simulating networks.

Figure 2 shows a basic arrangement using two error simulating networks 35 and 36. Network 35 corresponds to network 13 of Fig. 2. Network 35 simulates the transmission error of the transmission system 10, 21, 11 and 12 whereas network 36 simulates the remaining error of said transmission system by introducing the angle produced by network 35 into a second imitation of said transmission system, thus obtaining the value $\psi - \phi$ at its output shaft 39. Differential gearing 37 joins shaft 28 connected to line 35, shaft 39 connected to line 36 and intermediate shaft 40 which carries bevel gear 41 mating with gear 18. A connecting shaft 42 carries bevel gear 43 which mates with bevel gear 44 on the end of shaft 38', bevel gear 45 which mates with bevel gear 46 on the end of shaft 39' and bevel gear 47 mating with gear 17.

As can be seen, the inputs of the error simulating networks 35 and 36 are connected in parallel to the input of the telemetric control, whereas their outputs are algebraically combined by differential 37. The phase of the electrical rotary field vector can be evaluated at any instant as:

$$a_1(t) - \varphi(t) + [\varphi(t) - \psi(t)]$$

and the angular displacement of the receiver is obtained as $$a_2(t) = a_1(t) - \varphi(t) + [\varphi(t) - \psi(t)] + \psi(t) = a_1(t)$$

Figure 3A:
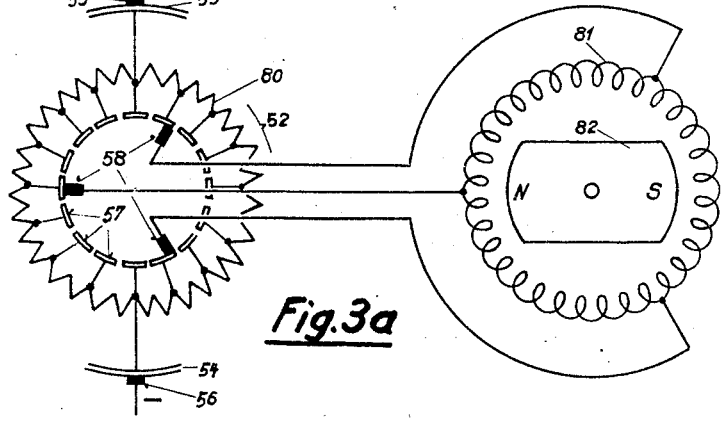
Fig. 3a is a schematic diagram of a self-synchronous transmission system.
Figure 3:
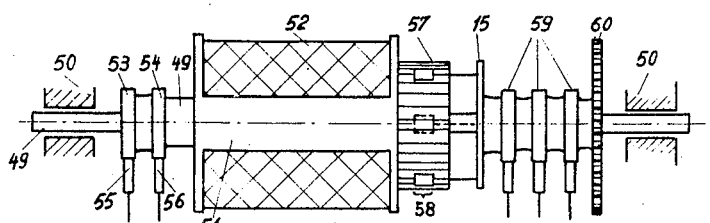
Figure 3 is a schematic diagram of a transmitter.

Figure 3 shows diagrammatically the constructional embodiment of a three-phase transmitter having two mechanical inputs. A continuous shaft 49, journaled in bearings 50, carries coil member 51 with its winding 52. On the left side are two slip rings 53 and 54 mounted on shaft 49 and served by positive brush 55 and negative brush 56 respectively through which direct current is supplied to winding 52. A modulator commutator 57 is mounted to turn with coil member 51 and cooperates with a brush system 15 comprising individual collector brushes 58 connected to three-phase alternating slip ring 59 rigidly joined together as a unit and rotatably disposed on shaft 49. The phase of the rotary field produced by windings 52 is a function of the relative position of collector 57 i. e. the resistance winding 52 with respect to brushes 58.

One mechanical input is, therefore, the shaft 49 which turns coil 52 and collector 57 as a unit and the second input comprises the brush system 15 with brushes 58 and rings 59 which can be positioned or driven by gear 90. When either the brush system 15 or the coil assembly 51 through 57 is not rotatable, but is rigidly arranged a resistance transmitter is produced which as shown in Fig. 1 and which has only one mechanical input. Because of the dynamic character of the load in the error simulating network, it is preferable to associate the control movement $a_1(t)$ with the rotor 16 or 49 of a transmitter and to have the error simulating network act on the rotary brush system 15 as said brush system has a moment of inertia considerably smaller than coil member 51.

There are two approaches to the problem of producing an error simulating network.

1. The system comprising the transmitter-receiver and load is duplicated as a small scale model. That is, a set-up is utilized as an error simulating network that is electromechanically analogous in all parts of the telemetric system. In Fig. 1, for example, an electrical error simulating network 13 is shown sketched in, consisting of the transmitter 22, the receiver 30, the error simulating network 33, the load 32 and the differential 14. The phase displacement error angle $\varphi$ is constantly created at the differential 14 and is mechanically transmitted in continuous fashion to the brush system 15. The proportioning must be such that the brush system 15 does not influence the properties of the network 13 to any appreciable extent.

Figure 4:
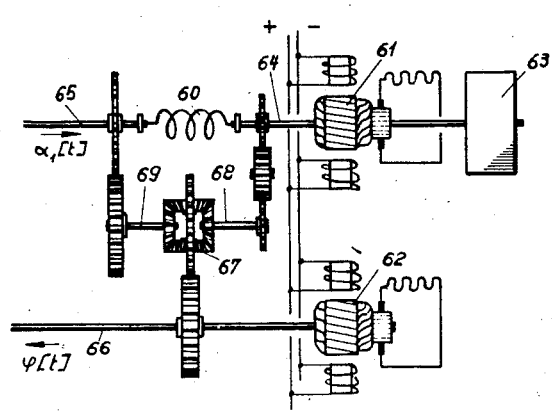
Figure 4 is a diagrammatic indication of a mechanical simulation of transmitter receiver load.

2. The system comprising the transmitter-receiver and load is mechanically simulated so that the same amplitude and phase relations prevail as in the case of actual telemetric transmission. Fig. 4 shows an embodiment of a mechanical simulation. The sketched-in elements are representative of the following:

A spring 60 is provided simulating the rigidity of the synchronous motor; 61 is a damping motor, the damping constant of which is such as to permit simulating the phase angle that is dependent on the angular velocity; the moment of inertia rotor may correspond to that of the rotor of the receiver 11. The damping motor 62 represents the relative damping of the receiver rotor with respect to the rotary field. Shunt-wound D. C. generators may be employed as damping motors, which are continually energized and the brushes of which are short circuited, thus requiring a torque proportional to the angular velocity of the armature. Finally, 63 represents the simulation of the load, in which case, in general, it is necessary to simulate the friction torque and the inertia torque. Damping motor 61 and load 63 are mounted on a shaft 64 one end of which is connected to spring 60. An input shaft 65 is connected to the other side of spring 60. Damping motor 62 is connected by shaft 66 to differential gearing 67 and so by shafts 68 and 69 to shafts 64 and 65. As has been explained above the resulting error angle of the transmission system corresponds to the lag of the synchronous motor. Said lag is necessary to produce the torque required to overcome the friction, damping and inertia of the receiver and the load. If consequently spring 60 simulates the rigidity of the synchronous motor and the elements 61 and 62 and 63 the respective characteristics of the transmission, the twisting of spring 60 will correspond to the error of the transmission system.

The principal difference between the two types of simulations is that in the case of the electrical simulation only the transmitter is involved and acts as a load on the drive shaft, whereas in the case of the mechanical simulation, all of the elements are mechanically associated with the drive shaft and serve to load the same accordingly.

If only a very small input rotational torque $a_1$ is available at the transmitter, it is preferable to use an electrical simulation whereas in other cases, if the input rotational torque is sufficiently great, a mechanical simulation offers a more serviceable solution.

Connecting the simulation or error simulating network to the transmitter by means of two mechanical inputs presents a clean-cut solution to the present problem. However, instances may be envisaged in which the supplementary loading of the transmitter by the error simulating network does not appear feasible. In such cases the transmitting error must be compensated at the receiving end. Here too the above recited limitation comes into play wherein the $\psi$ error of the receiver system is balanced out only to the extent to which it is possible to reproduce it correctly by the phase displacement error of the network introduced electrically into the telemetric control system by the error simulating network.

Figure 5:
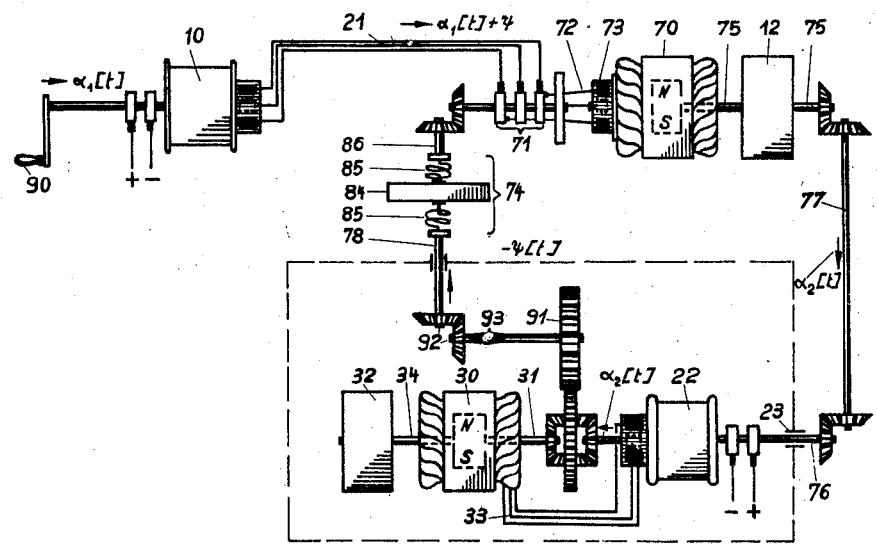
Figure 5 is a diagram of a system in which the error angle is corrected at the receiver end.

Fig. 5 shows such an embodiment in which the error angle $\psi$ is compensated at the receiver end. In this case a receiver motor 70 is required with an electrical and a mechanical input. Such properties are inherent in synchronous motors of the rotating field collector type. As shown, the three-phase current delivered by the transmitter over wires 21 is transmitted over slip rings 71, brush system 72 and collector 73 to the three-phase winding of the stator of receiver 70. The angle $\psi(t)$ produced by the error simulating network 13 mechanically effects shifting of the brush system 72.

It follows from Fig. 5 that controlling the network at the receiver involves fundamentally a feedback or reactive coupling, which could, in principle, engender instability of the system. In order to obviate this, supplementary means are required. As shown, a mechanical low pass filter 74 is sketched in which is so proportioned that its limiting frequency lies below the natural frequency of the compensated receiver arrangement, while on the other hand it lies so high that the reproduced error angle $\varphi$ is transmitted without distortion. The mechanical low pass filter consists of a mass 84 which is connected by two elastic members, e. g. springs 85, to two shafts, representing input 78 and output 86. In the frequency range well below the natural frequency of the filter 74 determined by the relative characteristics of inertia of the mass 84 and rigidity of the elastic members 85 the output shaft 86 will reproduce the movement of the input shaft 78, whereas above this frequency range practically no movement will be transmitted. If consequently the natural frequency of the low pass 74 is made smaller than the natural frequency of the compensated receiver system but greater than the frequency range of the movements to be transmitted i. e. of the function $a_1(t)$, the back coupling effects of the compensated system can be obviated.

Receiver 70 and load 12 are on a common shaft 75. Network 13 in Fig. 5 is mounted on a shaft 76 which is connected at one end to shaft 75 by a shaft 77 and at the other end by shaft 78 and suitable bevel gearing. Filter 74 is mechanically connected to network 13.

In Fig. 1 the rotary movement $a_1(t)$ to be transmitted is applied to shaft 16 beyond bevel gear 17 e. g. by a crank 90. The same rotary movement is introduced into the network 13 and the imitated transmission error $\varphi$ is introduced into the transmission system by ways of the rotatable brush mounting 15. Consequently the transmitted angular movement is determined by the function $a_1(t) \mp \varphi(t)$. The transmission error $\psi$ will be added to this value producing a movement of the receiver 11 determined by $a_2(t) = a_1(t) - \varphi(t) \pm \psi(t)$. If the imitated error $\varphi(t)$ can be made equal the real error $\psi(t)$, ensuring $a_1(t) = a_2(t)$ a transmission practically without error will result.

In Fig. 2 artificial line 35 supplies $\pm \varphi(t)$ and network 36 supplies $\pm [\psi(t) - \varphi(t)]$ which combine through differential gearing 37 to produce a composite $\psi(t)$ which is conveyed to gear 16 as before in Fig. 1.

In Fig. 4 rotary movement $a_1(t)$ to be compensated is applied to shaft 65 causing it to rotate shaft 69 and distort spring 60. Spring 60 transmits movement $a_1(t)$ as $a_1(t) \pm \psi(t)$ to shaft 64. The imitated error angle $\varphi$ is obtained at shaft 66, which is actuated by differential 67 combining the angular movement of shafts 65 and 64.

In Fig. 5 the error produced by network 13 is inserted into the transmission system by rotating brush assembly 72, which slides on commutator 73 connected to the threephase winding of the stator of receiver 70. Consequently the error $\psi$ of the transmission system is compensated as in the above described embodiments by the limitated error angle $\varphi$ and a transmission practically without error is obtained.

The above disclosure presents certain specific embodiments as illustrative of the invention. They are not intended to be limiting, but rather specific examples of the generic terms set forth in the claims. It is of the essence of the invention that the correction applied represents all the effective elements of the system for that is the way to obtain great accuracy. However the representation of all effective elements does not preclude combining several of them as a component of a simulating network or the representation of a single element of a system by several components of a simulating network, but does not cover those attempts at correction where the system to be corrected is represented by a single unit.

I claim:

1. In an apparatus for telemetric transmission of rotatory movements a transmitter and a receiver forming a transmission system, a load mechanically connected to said receiver to be rotated in accordance with the movement of said transmitter, electrical lines connecting said receiver to said transmitter, an error reproducing system comprising a network of equivalent elements substantially reproducing each element of said transmission system, where said network simulates the transmission error of said system and where the simulated transmission error obtained by said network is introduced into said transmission system in such a way that the transmission error of said system is compensated.

2. In an apparatus for telemetric transmission of rotatory movements a transmitter and a receiver forming a transmission system, a load mechanically connected to said receiver to be rotated in accordance with the movement of said transmitter, electrical lines connecting said receiver to said transmitter, an error simulating network comprising a second transmitter, a second receiver mechanically connected to a second load and connected to said second transmitter by electrical lines simulating the transmitter, the receiver and the load of said transmission system, where said second transmitter is mechanically connected to said transmission system and where the simulated transmision error is obtained in said network by combining the rotatory movement of the transmitter and of the receiver of said network by means of a mechanical differential and where said simulated transmission error is introduced into said transmission system in such a way that the transmission error of said system is compensated.

3. In an apparatus for telemetric transmission of rotatory movements a transmitter and a receiver forming a transmission system, a load mechanically connected to said receiver to be rotated in accordance with the movement of said transmitter, electrical lines connecting said receiver to said transmitter, an error simulating network comprising electrical and mechanical elements substantially reproducing the characteristics of each element of said transmission system, where said network is mechanically connected to said transmission system and where the simulated transmission error is obtained in said network by combining by means of a mechanical differential the rotatory movement introduced into said network with the rotatory movement of the means representing the characteristics of said load and where said simulated transmission error is introduced into said transmission system in such a way that the transmission error of said system is compensated.

4. In an apparatus for telemetric transmission of rotatory movements a transmitter and a receiver forming a transmission system, a load mechanically connected to said receiver to be rotated in accordance with the movement of said transmitter, electrical lines connecting said receiver to said transmitter, an error simulating network located at the emplacement of the transmitter simulating said transmission system, said network comprising means reproducing the characteristic error of each element of said system and means connecting said network and said system to introduce the simulated transmission error obtained by said network into said transmission system in such a way that the transmission error of said system is compensated 5. In an apparatus for telemetric transmission of rotatory movements a transmitter and a receiver forming a transmission system, a load mechanically connected to said receiver to be rotated in accordance with the movement of said transmitter, electrical lines connecting said receiver to said transmitter, an error simulating network located at the emplacement of the receiver and comprising means simulating the characteristic error of each element of said transmission system, and means connected to said network for introducing said error into said transmission system in such a way that the transmission error of said system is compensated.

6. In combination in an apparatus for telemetric transmission of rotary movements, comprising a signal transmitter, a signal receiver and electric lines connecting said transmitter and said receiver and forming a transmission system, a load connected to said receiver for rotation in accordance with a signal from said transmitter, an error simulating network comprising a second transmitter, a second load and a second receiver connected to both said second load and said second transmitter, said network having a relationship to said transmission system such that any error signal produced by said network bears a fixed relation to that produced by said system at any instant and means connecting said network and said system for introducing any error produced by said network into said system in such manner that error in said system is compensated.

7. The combination set forth in claim 6, said last named means comprising a gearing arrangement which introduces the error produced by the network into the system with reversed sign.

8. The combination set forth in claim 7, said last named means having a differential gear.

9. The combination set forth in claim 5 in which said net work is an element for element duplication of said system.

10. In an apparatus for the telemetric transmission of rotary movements, a transmitter, a receiver, a line connecting said transmitter and said receiver and forming a transmission line, a load connected to said receiver and to be rotated in accordance with movement of said transmitter, a second transmitter having characteristics related to those of said first transmitter, common input means for both transmitters, a second receiver, a second transmission line connecting said second transmitter and said second receiver, a second load connected to said second receiver and to be rotated in accordance with movement of said second transmitter, said second receiver, transmission line and load having characteristics related to said first receiver, transmission line and load equivalent to the relationship between said transmitters, differential means connected to said second transmitter and to said second receiver-load combination, said differential producing a signal representing a difference in movement of said second load and said second transmitter and means for introducing said signal into said first transmission system in such a way that the transmission error of said first system is compensated.

11. In an apparatus for the telemetric transmission of rotary movements, a first, second and third equivalent systems comprising respectively a transmitter, a receiver, a load connected to said receiver and a transmission line connecting said transmitter and receiver, signal differential means connected to inject a correcting signal into said first system, common input means to the transmitters of said systems, a second signal differential means connected to the transmitter and receiver of said second system and also connected to supply the same signal to said first differential means and to the transmitter of said third equivalent system, a third differential means connecting said common input means and the receiver of said third equivalent system and also connected to supply a signal to said first differential means whereby the residual angular displacement error between the transmitter and the load of said first system is reduced to a value less than the operative play of the system.

12. In an apparatus for the telemetric transmission of rotary movements, a transmitter, a receiver, a load connected to said receiver and to be rotated in accordance with movement of said transmitter, a line connecting said transmitter and said receiver and forming a transmission system, an error simulating network comprising a simulated transmitter, receiver, load and transmission line each equivalent to its counterpart in the said system, positive drive means connecting said system load and said equivalent transmitter, differential means connecting said equivalent transmitter and said equivalent receiver, and means connecting said differential means and said system for injecting a correction signal into said system.

13. The combination set forth in claim 12 low pass filter means forming part of said means connecting said differential means and said system.

EDGAR GRETENER.

REFERENCES CITED

The following references are of record in the file of this patent:

UNITED STATES PATENTS

| Number | Name | Date |
|---|---|---|
| 1,684,138 | Nixdorff | Sept. 11, 1928 |
| 1,743,252 | Tanner | Jan. 14, 1930 |
| 1,977,624 | Davis | Oct. 23, 1934 |
| 2,056,348 | Edwards | Oct. 6, 1936 |
| 2,151,718 | Riggs | Mar. 28, 1939 |
| 2,176,102 | Riggs | Oct. 17, 1939 |
| 2,197,386 | Ross | Apr. 16, 1940 |
| 2,403,605 | Lesnick | July 9, 1946 |
| 2,408,813 | Riggs | Oct. 8, 1946 |
| 2,414,689 | Edwards | Jan. 21, 1947 |
| 2,415,080 | Bonnell | Feb. 4, 1947 |
| 2,420,816 | Davis | May 20, 1947 |
| 2,421,230 | Agins | May 27, 1947 |
| 2,425,605 | Edwards | Aug. 12, 1947 |
| 2,531,488 | Wolf | Nov. 28, 1950 |
| 2,537,083 | Peoples | Jan. 9, 1951 |